United States Patent
Bulat et al.

(10) Patent No.: US 8,894,408 B2
(45) Date of Patent: Nov. 25, 2014

(54) COMBUSTION APPARATUS

(75) Inventors: Ghenadie Bulat, Lincoln (GB); Robin McMillan, Bardney (GB)

(73) Assignee: Siemens Aktiengesellschaft, Munich (DE)

( * ) Notice: Subject to any disclaimer, the term of this patent is extended or adjusted under 35 U.S.C. 154(b) by 15 days.

(21) Appl. No.: 13/500,178

(22) PCT Filed: Oct. 9, 2009

(86) PCT No.: PCT/EP2009/007299
§ 371 (c)(1),
(2), (4) Date: Apr. 4, 2012

(87) PCT Pub. No.: WO2011/042037
PCT Pub. Date: Apr. 14, 2011

(65) Prior Publication Data
US 2012/0196234 A1 Aug. 2, 2012

(51) Int. Cl.
| | |
|---|---|
| *F23D 5/12* | (2006.01) |
| *F23N 5/10* | (2006.01) |
| *F23R 3/34* | (2006.01) |
| *F02C 9/28* | (2006.01) |
| *F23N 1/00* | (2006.01) |
| *F23N 5/24* | (2006.01) |
| *F23R 3/28* | (2006.01) |
| *F23N 5/16* | (2006.01) |

(52) U.S. Cl.
CPC ............... *F23R 3/286* (2013.01); *F23N 5/102* (2013.01); *F23R 3/343* (2013.01); *F23N 2037/02* (2013.01); *F23C 2900/07001* (2013.01); *F05D 2270/082* (2013.01); *F05D 2270/112* (2013.01); *F02C 9/28* (2013.01); *F23N 1/002* (2013.01); *F23R 2900/00013* (2013.01); *F05D 2270/303* (2013.01); *F23D 2900/14021* (2013.01); *F23N 5/242* (2013.01); *F23N 5/16* (2013.01)

USPC ............... 431/13; 431/14; 60/39.281; 60/286

(58) Field of Classification Search
USPC .................... 431/13; 60/39.281, 286
See application file for complete search history.

(56) References Cited

U.S. PATENT DOCUMENTS

| | | | | |
|---|---|---|---|---|
| 3,941,144 | A  * | 3/1976 | Cornil | 137/110 |
| 7,484,352 | B2 * | 2/2009 | Flohr et al. | 60/39.281 |
| 7,614,106 | B2 * | 11/2009 | Oh et al. | 8/158 |
| 2008/0016875 | A1* | 1/2008 | Ryan et al. | 60/776 |
| 2009/0133379 | A1* | 5/2009 | Mendoza et al. | 60/39.281 |

FOREIGN PATENT DOCUMENTS

| | | |
|---|---|---|
| CN | 1034259 A | 7/1989 |
| CN | 1043189 A | 6/1990 |
| CN | 101360900 A | 2/2009 |

(Continued)

*Primary Examiner* — Kenneth Rinehart
*Assistant Examiner* — Gajanan M Prabhu

(57) ABSTRACT

A combustion apparatus includes a fuel supply line for providing an overall fuel supply to the apparatus; a burner including multiple fuel supply lines, the supply of fuel in the fuel supply lines to the burner corresponding to the overall fuel supply in the fuel supply line to the apparatus, and a combustion volume associated with the at least one burner. A temperature sensor measures a temperature of a part of the apparatus to be protected against overheating. A pressure sensor measures pressure within the combustion volume. A control arrangement varies the fuel supplies to the burner based on the measured temperature and pressure and on an information indicative for a progress over time for a signal for a time span. The arrangement maintains the temperature of part to be protected and the pressure variations within the combustion volume below predetermined limits, while maintaining constant fuel supply to the apparatus.

13 Claims, 7 Drawing Sheets

(56) References Cited

FOREIGN PATENT DOCUMENTS

| | | |
|---|---|---|
| EP | 1331448 A2 | 7/2003 |
| EP | 1387062 A2 | 2/2004 |
| EP | 1605208 A1 | 12/2005 |
| GB | 2434437 A * | 7/2007 |
| RU | 2108475 C1 | 4/1998 |
| RU | 2199019 C2 | 2/2003 |
| WO | WO 2005093327 A1 | 10/2005 |

\* cited by examiner

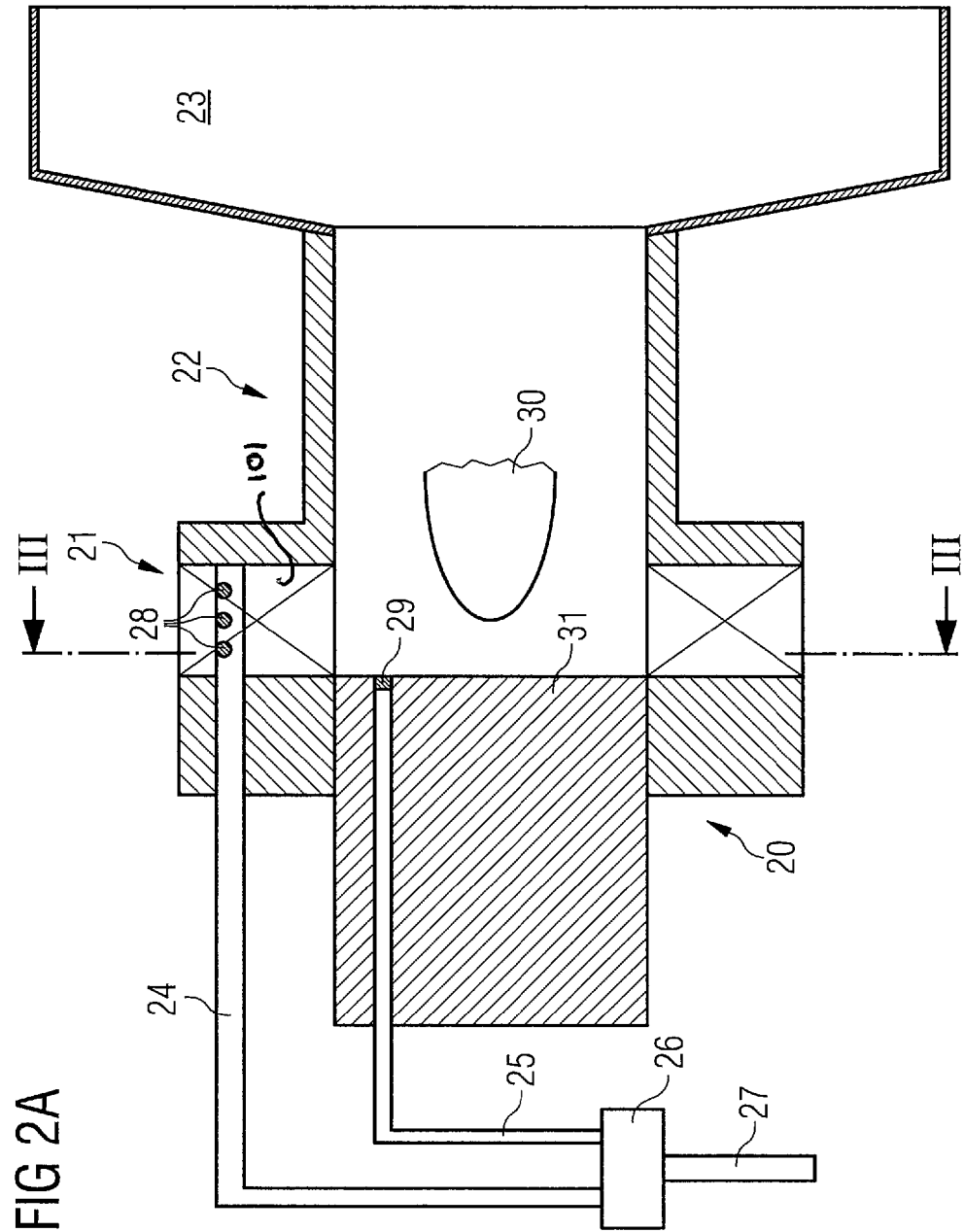

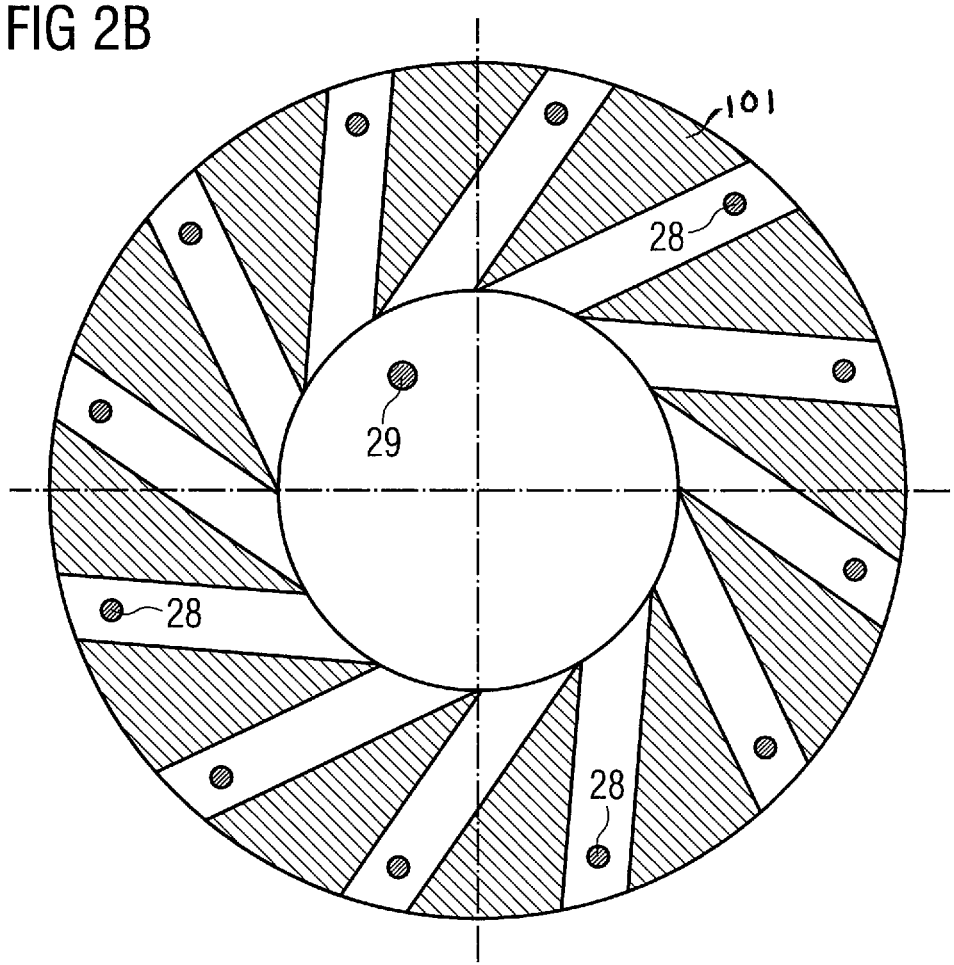

COMBUSTION APPARATUS

CROSS REFERENCE TO RELATED APPLICATIONS

This application is the US National Stage of International Application No. PCT/EP2009/007299, filed Oct. 9, 2009 and claims the benefit thereof. All of the applications are incorporated by reference herein in their entirety.

FIELD OF INVENTION

The invention relates to a combustion apparatus and to a combustion apparatus constituted in particular by a gas turbine. Combustion apparatus is employed in a number of different environments, including gas turbines, furnaces and boilers.

BACKGROUND OF INVENTION

An example of a typical gas-turbine arrangement is shown in an abstract way in FIG. 1. The gas turbine comprises an air inlet 10 at one end followed by a compressor stage 11 in which incoming air is compressed for application to one or more combustors 12, which are distributed circumferentially around the turbine axis 13. Fuel is introduced into the combustors at 14 and is there mixed with a part of the compressed air leaving the compressor stage 11. Hot gases created by combustion in the combustors 12 are directed to a set of turbine blades 15, being guided in the process by a set of turbine guide vanes 16, and the turbine blades 15 and a shaft, forming the axis 13, are turned as a result. The turbine blades 15 in turn rotate the blades of the compressor stage 11, so that the compressed air is supplied by the gas turbine itself once this is in operation.

Part of a typical combustor is schematically shown in FIG. 2A. (FIG. 2B is a section along a line III-III shown in FIG. 2A.) The combustor is in four parts: a front-end part 20—a burner—, a swirler part 21, a burner pre-chamber part 22 and a combustion volume 23. Main fuel is introduced into the swirler part 21 by way of the front-end part 20 through a conduit 24, while pilot fuel enters the burner space through a conduit 25 having at its end a pilot-fuel nozzle 29 or via a series of injection nozzles or holes. The main and pilot fuel-flows are derived from a fuel-split valve 26, which is fed with a fuel supply 27 representing the total fuel supply to the combustor. The main fuel flow enters the swirler through a set of main-fuel nozzles (or injector) 28, from where it is guided along swirler vanes 101 of the swirler part 21, being mixed with incoming compressed air in the process. The resulting air/fuel mixture maintains a burner flame 30. The hot air from this flame enters the combustion volume 23.

A gas turbine will often comprise a number of such combustors, in which case the main and pilot fuel-flow distribution will usually be as shown in FIG. 3. A common supply of fuel for all combustors will be divided into a main fuel supply for all combustors and a pilot fuel supply also for all combustors.

SUMMARY OF INVENTION

It is a common problem that, due to the high temperatures generated inside such combustors, various component parts of the combustors run the risk of overheating, which can seriously damage the combustor, or at least impair its performance. Also NOx emissions—NOx stands for oxides of nitrogen as the chemical compounds NO and $NO_2$—are a major concern. It is an aim of the invention to provide a combustion apparatus which reduces the risk of such overheating and is directed to create only low emissions at a wide range of operation.

This objective is achieved by the independent claims. The dependent claims describe advantageous developments and modifications of the invention.

In accordance with a first aspect of the present invention there is provided a combustion apparatus comprising:
- a fuel supply line to the combustion apparatus for providing an overall fuel supply to the combustion apparatus;
- at least one burner including a plurality of fuel supply lines to the at least one burner, the supply of fuel in the plurality of fuel supply lines to the at least one burner corresponding to the overall fuel supply in the fuel supply line to the apparatus;
- a combustion volume associated with the at least one burner;
- a temperature sensor located in the apparatus such as to be able to convey temperature information relating to a part of the apparatus which is to be protected against overheating;
- a pressure sensor such as to be able to convey pressure information representing pressure within the combustion volume; and
- a control arrangement.

The control arrangement is arranged to vary the fuel supplies to one or more of the at least one burner based on the temperature information and on the pressure information and on a further information, the further information being indicative for a progress over time for a signal for a time span defined by a time information, such as to maintain the temperature of said part to be protected below a predetermined maximum temperature limit, and such as to keep the pressure variations within the combustion volume below a predetermined maximum pressure variation limit, while keeping the overall fuel supply in the fuel supply line to the apparatus substantially constant.

The inventive concept is specifically advantageous because it can be avoided to operate the apparatus in a unstable condition or in a condition which results in a too high temperature impacts on surfaces within the combustion volume or on the burner. By also considering the time information, it is possible to vary the fuel supplies at discrete points of time and keep the fuel supply unvaried in between. Besides this allows to vary the fuel supplies frequently in such a way, that the point of operation will stay close to but not in a specific range of operation, e.g. close to operational points in which higher pressure dynamics occur (with the advantage that less NOx will be produced) or in which high temperatures occur (with the advantage that the apparatus will provide a stable combustion). On the other hand, the evaluation of the further information which is indicative for a progress over time for the signal may guarantee that the variation of the fuel supplies does not occur in a too frequent manner allowing a steady-going mode of operation without changing the valve settings for the fuel supplies continuously and avoiding oscillations for the valve settings.

Besides, by evaluating the progress over time for the signal, spikes and noise that may be within the signal may be disregarded.

In a first embodiment the signal to be processed may represent one of a load information and the pressure information, the load information being indicative for a load of the combustion apparatus. With that it can be monitored whether dynamic pressure fluctuations will occur repeatedly over the time span and if so steps can be performed by varying the fuel supplies to provide an operation with improved dynamic pressure fluctuations. An "improvement" of dynamic pressure fluctuations can be seen, if at least for a specific bandwidth, the number or the amplitude of dynamic pressure fluctuations decrease.

In a further embodiment and in a first mode of operation the control arrangement may further be configured such as to vary the fuel supplies at points in time defined by the time information in such a way that the temperature of said part to be protected is regulated so that the difference of the predetermined maximum temperature limit and the temperature of said part represented by the temperature information does not exceed a predefined temperature threshold. This may avoid overheating of parts.

In yet another embodiment and in a second mode of operation the control arrangement may further be configured such as to vary the fuel supplies at points in time defined by the time information in such a way that the pressure variations are regulated so that the difference of the predetermined maximum pressure variation limit and the pressure variations or fluctuations represented by the pressure information does not exceed a predefined pressure variations threshold. Evaluation may be limited—e.g. via a bandwidth operation—to only a specific band of pressure frequencies that may be considered harmful for a stable operation, e.g. because a resonance frequency within the combustion value is hit and/or the pressure pulsation negatively effects the flame, e.g. so that a risk of flame-out may rise.

Preferably, the control arrangement may further be configured such as to evaluate the progress over time of the signal by performing an averaging or summarising step of the signal for the time span defined by the time information, particularly to determine an integral of a pressure or load value over the time span or to determine an average of a pressure or load value over the time span. Before the averaging or summarising step will be applied, the signal may be pre-processed, e.g. via filters. The integral may be processed in relation to a threshold value. By processing the integral or the average, a general tendency for the operation of the combustion apparatus can be identified, and if the operation proceeds or stays in an unwanted region, countermeasures can be taken by varying the fuel supplies. It is considered advantageous that by this operation single spikes or noises in the evaluated signal—e.g. the pressure dynamics or the load—may be disregarded so that variation of the fuel supplies will only initiated if a constant and stable operation—in an unwanted region—is perceived.

In the following, the previously mentioned second mode of operation will be discussed in more detail, in which an operation close to the predetermined maximum pressure variation limit is provided.

In a preferred embodiment the control arrangement may further be configured such as a time integral value is determined by performing a time integral based on the pressure information and the time information. Particularly, the time integral value may only be determined if the pressure information represents a dynamic pressure value that falls below a predefined further pressure variation limit value. In other word, a dynamic pressure value that falls below a predefined further pressure variation limit value initiates the evaluation of the time integral. For such a configuration, the control arrangement may further be configured such as the fuel supplies are varied by a first variation value if the time integral value exceeds—possibly only absolute values are compared—a predefined first time integral limit value. Specifically, if the time integral shows that the dynamic pressure values stay continuously above the first time integral limit value a pilot fuel supply may be raised to gain a more reliable combustion.

Besides, the control arrangement may further be configured such as—after a previous variation of the fuel supplies—if the pressure information indicates that the predetermined maximum pressure variation limit is reached by the pressure variations, the fuel supply is varied by a second variation value such as to neutralise, at least partly, the fuel supply variation by the first variation value. This is advantageous because the combustion apparatus will not be operated directly at the maximum pressure variation limit but with a pre-defined distance to that limit.

Additionally, the operation may be extended such as if the pressure information may indicate that the pressure variations under-run the predetermined maximum pressure variation limit more than a predefined pressure variation difference, the fuel supply is varied by a third variation value, advantageously in the same "direction" as the first variation value and possibly by the value of the first variation value. This allows to generate a staircase like curve—see FIG. 6A—for which the operation of be kept close to the predetermined maximum pressure variation limit.

In the following, still for the second mode of operation, the progress over time will be evaluated by a time averaging operation instead of the previously mentioned integration.

Besides the dynamic pressure, also load information can be evaluated as the signal over time. Specifically the combustion apparatus may further comprise a revolvable shaft and an engine load indicator located in the apparatus such as to be able to convey load information representing engine load or torque of the shaft or revolving speed of the shaft. Further operating parameters or a combination of such parameters can be considered to be indicative for the engine load. This may depend on the actual combustion apparatus.

Advantageously the control arrangement may further be configured such as to keep the fuel supplies constant for a time span defined by the time information and to collect the load information during the time span. Therefore too rapid corrections of the fuel supplies will be avoided. The control arrangement may further be configured such as to vary the fuel supplies by a first variation value after a time lapse of the time span if a variation the collected load information during the time span stays below a predefined load threshold, e.g. a 5% variation of the load within the time span. The variation of the fuel supply may result in a decrease of pilot fuel, if the combustion should be operated close to the predetermined maximum pressure variation limit.

As mentioned before, the control arrangement may further be configured such as—after a previous variation of the fuel supplies—if the pressure information indicates that the predetermined maximum pressure variation limit is reached by the pressure variations, the fuel supply is varied by a second variation value such as to neutralise, at least partly, the fuel supply variation by the first variation value. As stated before, this is advantageous because the combustion apparatus will not be operated directly at the maximum pressure variation limit but with a pre-defined distance to that limit.

Further operation also was explained in a different scenario. Specifically, the operation may be extended such as if the pressure information may indicate that the pressure variations under-run the predetermined maximum pressure variation limit more than a predefined pressure variation difference, the fuel supply is varied by a third variation value, advantageously in the same "direction" as the first variation value and possibly by the value of the first variation value. This allows to generate a staircase like curve—see FIG.

6A—for which the operation of be kept close to the predetermined maximum pressure variation limit.

In the following, the previously mentioned first mode of operation will be discussed in more detail, in which an operation close to the predetermined maximum temperature is provided.

For an initial step, the control arrangement may further be configured such as if the temperature information indicates that the predetermined maximum temperature limit is reached by the temperature, the fuel supply is varied by a fourth variation value such as to neutralise, at least partly, the fuel supply variation by the first variation value.

After this variation, the control arrangement may further be configured such as to keep the fuel supplies constant for a time span defined by the time information and to collect the load information during the time span. As before, therefore too rapid corrections of the fuel supplies will be avoided. The control arrangement may further be configured such as to vary the fuel supplies by a first variation value after a time lapse of the time span if a variation the collected load information during the time span stays below a predefined load threshold, e.g. a 5% variation of the load within the time span. The variation of the fuel supply may result in an increase of pilot fuel, if the combustion should be operated close to the predetermined maximum temperature limit.

The processing may be continued in a way, that the control arrangement may further be configured such as if the temperature information indicates that the predetermined maximum temperature limit is reached again by the temperature a second or a further time, the fuel supply is varied by a fifth variation value, advantageously in the same "direction" as the first variation value and possibly by the value of the first variation value. Applying several of the previous configurations will allow providing an operation that will stay close to the predetermined maximum temperature limit.

For all modes of operation the following structural configurations apply and may be advantageous.

For example, the plurality of fuel supply lines may comprise a first, main fuel supply line and a second, pilot fuel supply line to each of the at least one burner. Furthermore the plurality of fuel supply lines may comprise first and second main fuel supply lines to each of the at least one burner.

The control arrangement may be arranged to vary the ratio of fuel supplies in the first and second fuel-supply lines in at least one of the at least one burner, while keeping the total fuel supply to that burner substantially constant. Alternatively, the apparatus may comprise a plurality of burners and the control arrangement may be arranged to vary the ratio of fuel supplies in the first and second fuel-supply lines in one burner, while allowing the total fuel supply to that burner to vary, the variation of the total fuel supply to that burner being compensated by a corresponding opposite variation in the total fuel supply to another one or more burners.

The part to be protected may be at least one of the following: a front face of the at least one burner, a wall of a pre-chamber of the at least one burner, a wall of the combustion volume, and a lance situated within a swirl chamber of the burner.

The temperature sensor may be located on or in the part to be protected, which may be any of: a front face of the at least one burner, a wall of a pre-chamber of the at least one burner, a wall of the combustion volume and a lance situated within a swirl chamber of the burner.

The temperature sensor may be located such as to be able to sense the temperature of gases entering the at least one burner. Alternatively, where the combustion apparatus is a gas turbine, it may be located at a downstream end of the combustion volume such as to be able to sense the temperature of a turbine vane of the gas turbine engine. As a further alternative, the temperature sensor may be located in a fuel-supply line to the at least one burner.

The combustion apparatus may be a gas turbine engine and the combustion volume may comprise a combustion volume of the gas turbine engine. Alternatively, the combustion apparatus may be a boiler or a furnace.

Previously the control arrangement was defined structurally. It may also be possible to define method steps performed by this control arrangement and to claim merely these method steps. This will not be executed at this point because most of this would be repetitive. Nevertheless the claims may also be defined as method steps evaluating input information like the temperature information, the pressure information, and the load information and controlling the fuel supplies settings. A person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the drawings, of which:

FIG. 2A is longitudinal section of a typical combustor and FIG. 2B is a section along line III-III in FIG. 2A;

DETAILED DESCRIPTION OF INVENTION

Figure 1:
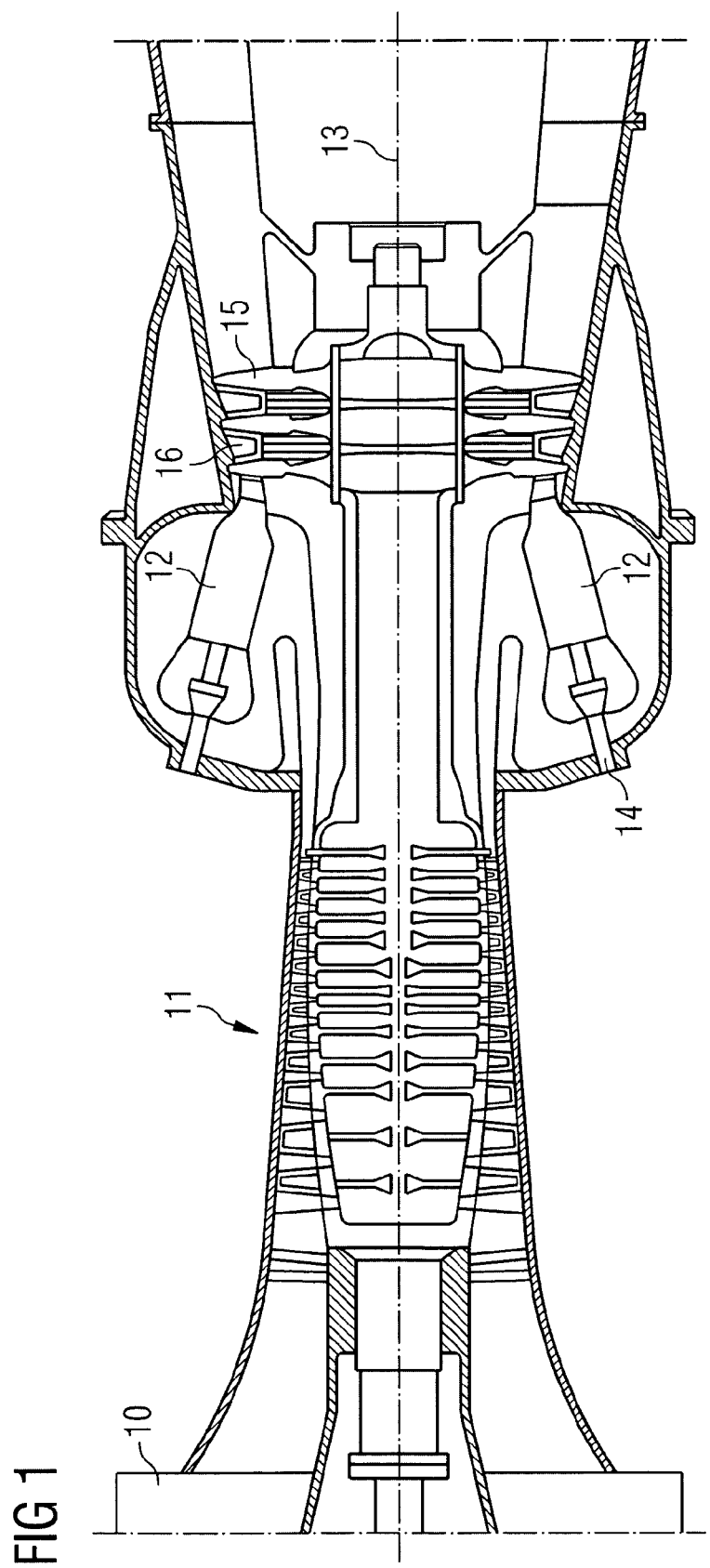
FIG. 1 is a longitudinal section of a typical gas turbine.

The illustration in the drawing is schematical. It is noted that for similar or identical elements in different figures, the same reference signs will be used.

The present inventors have recognised that it is possible to prevent over-heating of a component part of a combustion apparatus due to the combustion process in the combustion area by varying the main/pilot fuel supplies to the combustor without varying the overall fuel supply to the apparatus. It is normally desirable to maintain a constant total fuel supply to a combustor (or set of combustors, where there is more than one) in order to match a constant load imposed on the apparatus, which may be, for example, a gas turbine. Where the load on the gas turbine changes, it will then be necessary to change the total fuel supply to the gas turbine, but not otherwise, normally.

Figure 3:
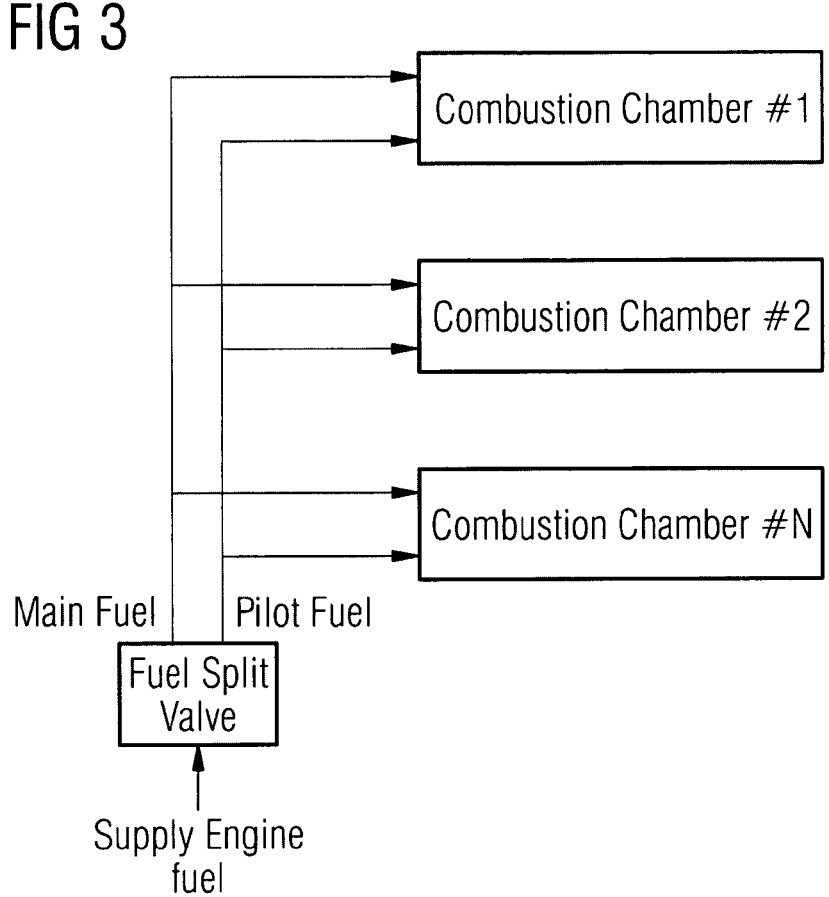
FIG. 3 is a block diagram illustrating the derivation of main and pilot fuel supplies in a typical gas turbine with multiple combustors.
Figure 5:
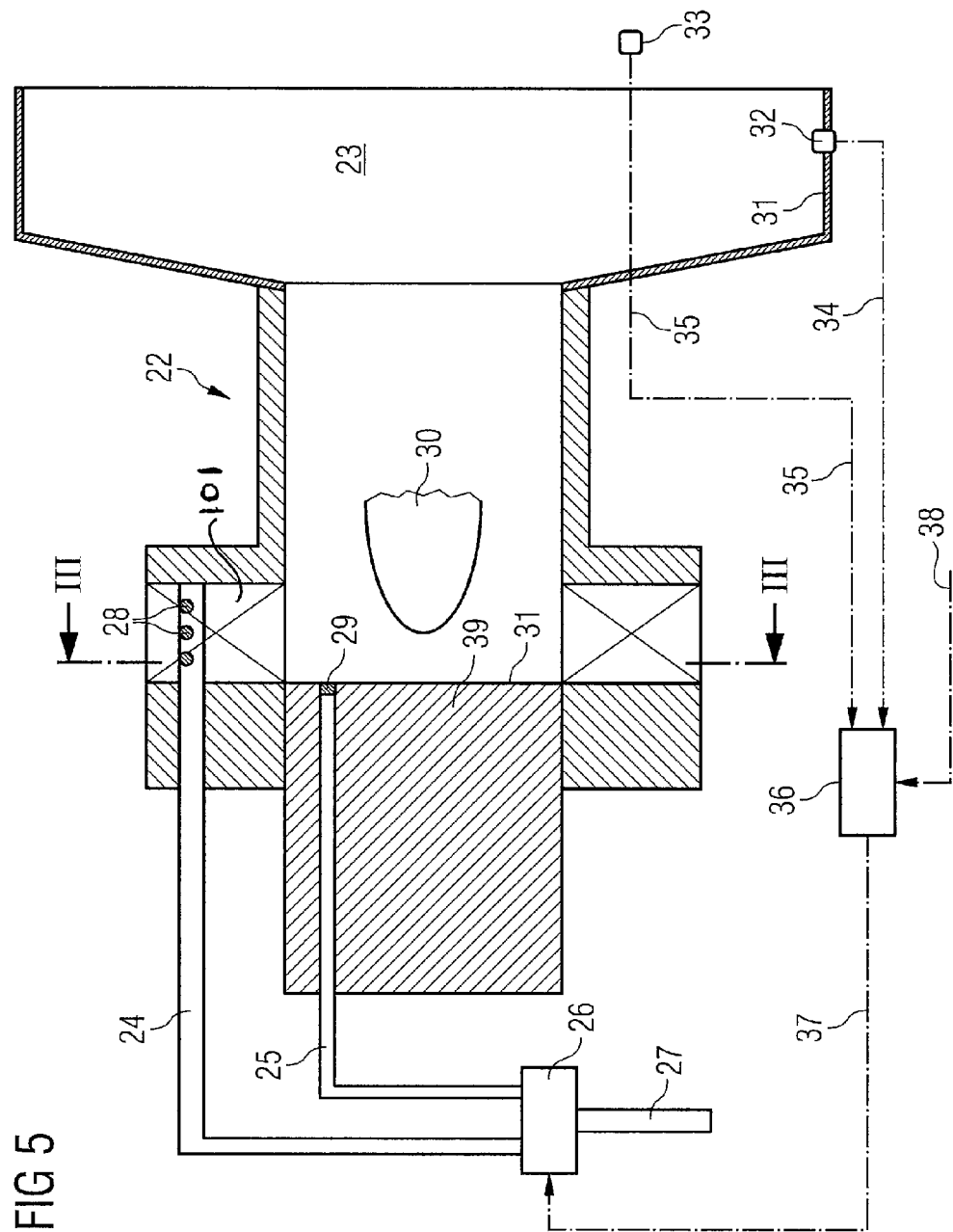
FIG. 5 is one example of temperature and pressure sensor placing in a combustion apparatus in accordance with the invention.

According to a preferred embodiment the fuel is introduced within the combustion chamber of the gas turbine in multiple injection points—main-fuel nozzles (or injector) 28 and pilot-fuel nozzle 29 as seen in FIGS. 2, 3, and 5—using multiple fuel supply lines 24, 25 (see FIG. 5). The fuel will be fed through different fuel supply lines (pilot fuel supply line 25 and main fuel supply 25) and the split ratio will be controlled by a so called Engine Control Unit as an inventive control arrangement 36 through valves.

Typically the fuel injection ratio between the pilot fuel supply line 25 and main fuel supply 25 is set over different loads via pre-defined fuel split maps to achieve the best performance and NOx over entire operating range. According to the invention the use of pre-defined fuel split maps is limited to specific operating ranges because pre-defined fuel split maps need to be set at rather conservative levels with respect to low emissions in order to ensure full operability.

The main disadvantage of pre-defined fuel split maps used over the whole operating range is that pre-defined fuel split maps do not consider changes in engine characteristics that can arise, due to, for example, variation in ambient temperature, manufacturing tolerances and specific site demands. In addition, narrow operating margins can sometimes be experienced on predefined operating maps, where, for example, boundaries of high metal temperature (region A on FIG. 4) and high combustor pressure fluctuations (region B on FIG. 4) lie close to each other.

Figure 4:
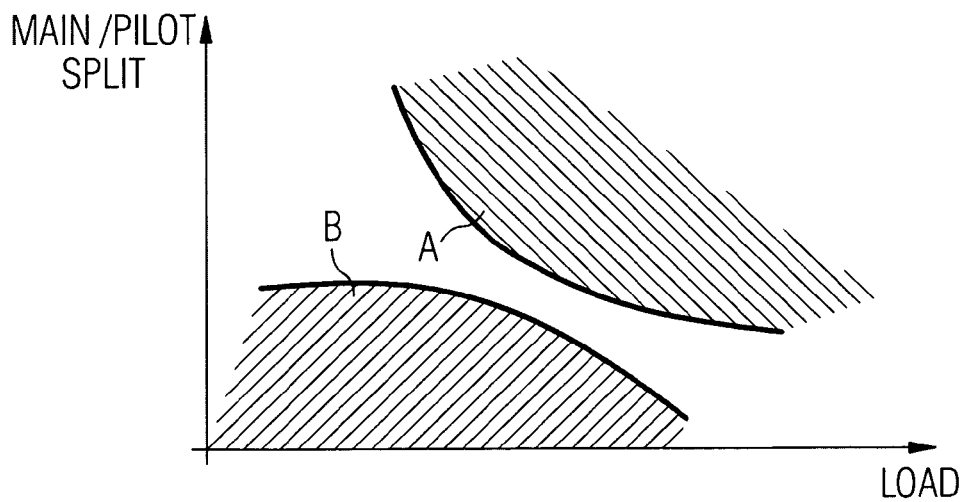
FIG. 4 is a graph plotting main/pilot fuel split for different values of load, as relevant to the present invention.

The concept behind the present invention is illustrated in FIG. 4, which is a graph of load versus main/pilot fuel split. The horizontal axis represents low loads of on the left hand side and high loads on the right hand side. The vertical axis represents a fuel split with a substantial amount of fuel via pilot fuel supply at higher ranges of the vertical axis. Less amounts of fuel via the pilot fuel supply will be marked at lower ranges of the vertical axis. The vertical axis does not show absolute values of fuel supply but the relative value of the pilot fuel supply in comparison to main fuel supply.

In the graph the hatched area referenced as A represents a set of operating conditions in which a component part of a combustor is in danger of suffering damage due to overheating. For example there may be conditions in which a specific main-to-pilot-fuel-split will result in overheating of a combustor surface for a given load. Hence the invention strives to derive, for a given load, a division (split) between the main and pilot fuel-flows such that area A is avoided.

At the same time the invention strives to keep operation away from an area B. For one specific case, the area B represents a set of operating conditions in which the amplitude of dynamic pressure oscillations in the combustion area is undesirably high. When such dynamic pressure oscillations exceed acceptable levels, the operation of the gas turbine and/or the mechanical longevity of the combustion system can be severely impacted.

Hence it is desirable also to be able to keep away from area B as well as area A. This is realised according to the invention.

The frequency of the dynamic pressure oscillations depends on the geometry of the combustor and the characteristics of the acoustic system of which it is a part and may range from below 100 Hz up to several kHz. In order to achieve appropriate variation of the main/pilot fuel-flow split, both the temperature of an appropriate point associated with the combustor and the pressure oscillations are monitored by means of sensors.

Referring now to FIG. 5, which corresponds to FIG. 2A, the temperature and pressure oscillations in this combustor arrangement are measured by placing, firstly, a temperature sensor 32 on a life-critical part of the combustor and, secondly, a pressure sensor 33 within the combustor volume 23. In this example the life-critical part is the circumferential wall defining the combustion volume 23. The outputs 34 and 35 from the two sensors are taken to a control unit 36 as a control arrangement.

As a further input 38 to the control unit 36 a load information is provided. The load information may represent a speed or a power output of a driven generator which may be connected to the shaft and driven by the shaft of the gas turbine, generated power by the driven generator, a rotational speed of a shaft of the gas turbine, or a torque provided by the shaft. The load information may also represent the mass flow exiting the combustion chamber. It may be taken from a sensor (not shown in FIG. 5) or may be derived from a further operating parameter. The load information may also be a combination of the above mentioned definitions.

Based on the information provided via in-/outputs 34, 35, 38 the control unit 36 controls the ratio of main and pilot fuel through the valve 26 by providing a control signal via an output 37 of the control unit 36.

The control unit 36 contains a processing apparatus to carry out processing steps suitable for keeping the operation of the gas turbine inside the safe area between areas A and B in FIG. 4. An example of such a processing will be given in the following.

In a first embodiment, the gas turbine will be operated with high NOx reduction by running close to region B that represents operating points with high pressure fluctuation. This embodiment is explained by referencing to FIG. 6A.

According to FIG. 6, the split between pilot fuel supplied to the pilot-fuel nozzle 29 and main fuel supplied to the main-fuel nozzles 28 follows the curve 60. The curve 60 follows a pre-defined fuel split map within an area of 61 for low load and an area 63 of high loads. Within the area 62 of medium loads FIG. 6 shows an area in which the curve 60 would follow the dashed line if the pre-defined fuel split map would be followed. In contrast to that the actual curve, which is a result of the inventive concept, is shown as a solid line in the areas 61, 62, 63 and "corrects" the fuel split so that none of the regions A or B will be a permanent point of operation.

For very low loads a high value of pilot fuel is provided to the burner. This fuel split will stay unmodified until the load reaches a threshold C. The threshold C defines an "activation load", which corresponds to the engine load above which it is considered that it is necessary to run the control part of the inventive processing. If loads exceed the threshold C the pre-defined fuel split map defines that the main/pilot fuel split is altered in a way that the pilot fuel supply is reduced and the main fuel supply is increased. The procedure is then repeated substantially continuously to follow the pre-defined fuel split map.

If the load passes the threshold C or alternatively over the whole range of loads, the control arrangement 36 is configured to read the outputs of pressure sensor 33 providing a pressure information and the temperature sensor 32 providing a temperature information and the engine load indicator providing a load information.

In the next time periods, the temperature information is gathered and compared to a predetermined maximum temperature limit. Besides, the pressure information is gathered and compared to a predetermined predetermined maximum pressure variation limit.

If either of these conditions is true, then the active pilot control processing according to the invention is activated. If not, the main/pilot flow split map is checked for any change from the default setting.

Figure 6A:
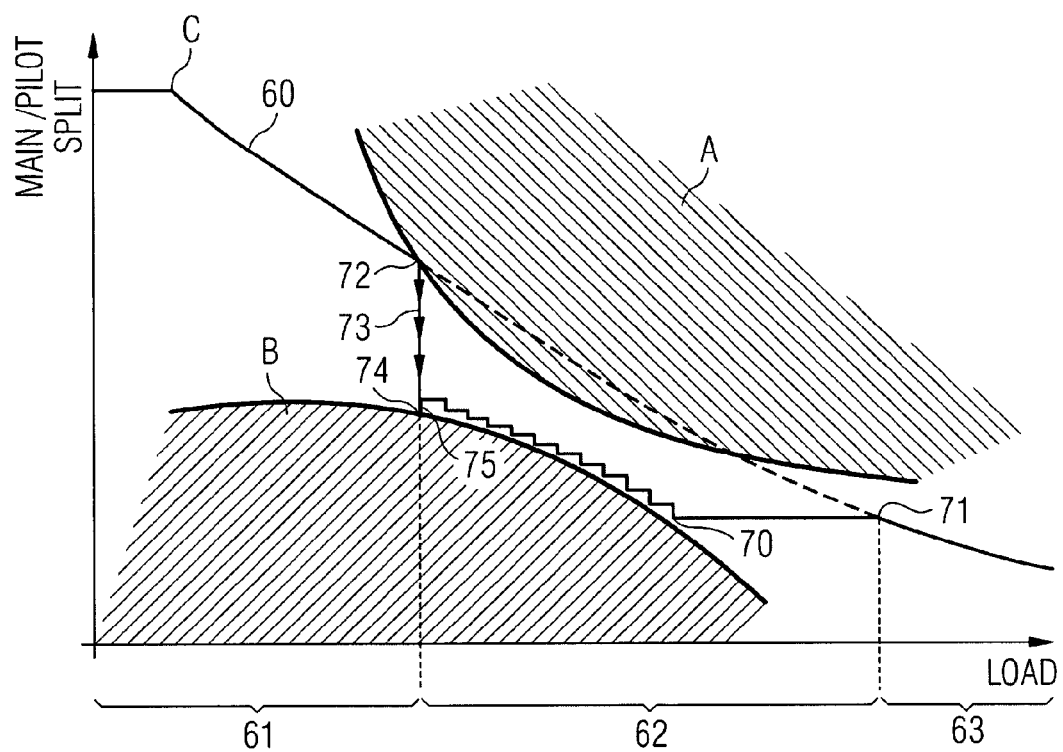
FIG. 6 shows exemplary diagrams illustrating the effect of the control mechanism.
Figure 6B:
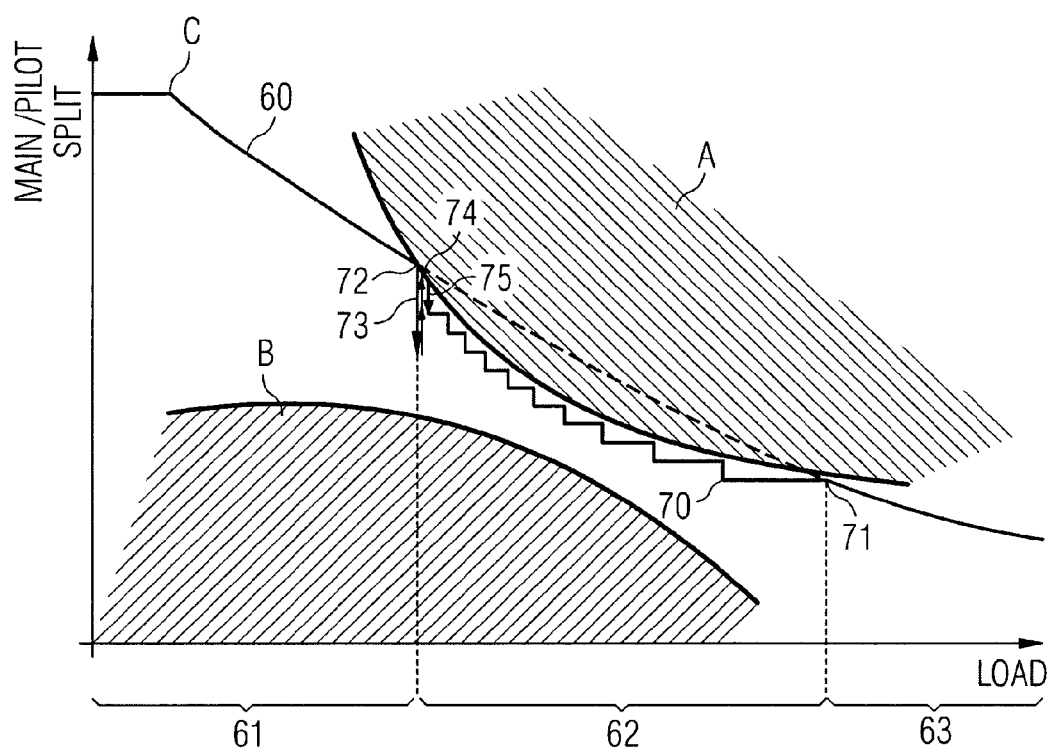

As a first example, shown in FIG. 6A, it is now assumed that the fuel supply follows the main/pilot flow split map and at some point the load rises such as to start to encroach on area A. This is shown as point 72 in FIG. 6A. Under these circumstances the temperature information parameter will exceed the allowed maximum, the predetermined maximum temperature limit. As a result a specific active pilot control is started and the split is decremented to an assumed point 73. The pressure dynamic signal is monitored further and provided as the pressure information to the control arrangement 36. If the pressure information represents a pressure dynamic value that is under a certain predefined value, a time integral over the pressure dynamic value is computed over a time defined by a time information. This time integral corresponds to the inventive further information that is indicative for a progress over time for a signal, the signal being the pressure dynamic value. If this time integral value exceeds a predefined first time integral limit value, then the inventive fuel split control will reduce the pilot fuel at a set ratio until region B will be hit (point 74). If region B is hit the pilot fuel will be increased slightly (75) to be at an operating point in the target area between region A and region B, but close to region B.

The integral may be taken between a curve and a given dynamic pressure limit. For a minimum limit also an inverse of the integral may be taken if the to be computed integral would result in a negative value in cases in which the computed area is between the curve and the limit and the curve being below the limit.

For the dynamic pressure values also specific bands of frequencies may be focused on. Before building the integral only a specific band of frequencies may be considered, e.g. by applying a bandwidth operator. With that, pressure frequencies that would result in a flame out could be focused on, for example.

Having processed these steps, no further main/pilot fuel split alterations will be executed as long as the load remains constant.

Also from this point on—as one possible embodiment—, no fuel split adjustments may be executed until region A, region B, or the default fuel split map is hit.

Alternatively, further fuel split adjustments may be possible and advantageous. Load changes may be monitored which can be diagnosed via the load information provided to the control arrangement 36. Once the load has increased by a predefined value—or, independently of the load, simply be waiting a pre-defined time—the previously disclosed processing that start for point 72 will be executed a further time. This will be executed in several iterations and the fuel split may be updated so that the operating point of the gas turbine will be held close the region B. This can be seen FIG. 6A by a staircase-like curve on the left hand side in the area 62.

This mode of operation may continue with a number of subsequent iterations. This processing may end if an upper load limit or a minimum pilot fuel supply setting is reached (point 70). Then the main/pilot fuel split may stay unmodified (see curve on the right hand side of area 62) until the default fuel split may can be followed again in area 63, starting at point 71.

In the first example, a time integral was built. Now in a second example, a different implementation is shown. Again it is referred to FIG. 6A.

According to this second example, it is again assumed that the fuel supply follows the main/pilot flow split map and at some point the load rises such as to start to encroach on area A (point 72). Under these circumstances the temperature information parameter will exceed the allowed maximum, the predetermined maximum temperature limit. As a result a specific active pilot control is started and the split is decremented to an assumed point 73. From this point of time, operating conditions will be monitored for a time span—e.g.

15 to 30 minutes—defined by the time information. Over this time span the operation load will be monitored and a time average is build over the load—the time average over the load being the further information indicative for a progress over time, according to the invention. If the time average value remains relatively constant—e.g. with a variation up to 5%—then the control processing will reduce the pilot split at a set ratio and the previous steps of monitoring the load over a time span and building a time averaging time value will be restarted.

This processing will be continued in iterations and the inventive fuel split control will reduce the pilot fuel at a set ratio until region B will be hit (point 74). If region B is hit the pilot fuel will be increased slightly (75) to be at an operating point in the target area between region A and region B, but close to region B.

Having processed these steps, no further main/pilot fuel split alterations will be executed as long as the load remains constant.

Also from this point on, no fuel split adjustments may be executed until region A, region B, or the default fuel split map is hit.

Alternatively, further fuel split adjustments may be possible. Load changes may be monitored which can be diagnosed via the load information provided to the control arrangement 36. Once the load has increased by a predefined value—or, independently of the load, simply be waiting a pre-defined time—the previously disclosed processing that start for point 72 will be executed a further time. This will be executed in several iterations so that the operating point of the gas turbine will be held close the region B. This can be seen FIG. 6A by a staircase-like curve on the left hand side in the area 62.

This mode of operation may continue with a number of subsequent iterations. This processing may end if an upper load limit or a minimum pilot fuel supply setting is reached (point 70). Then the main/pilot fuel split may stay unmodified (see curve on the right hand side of area 62) until the default fuel split may can be followed again in area 63, starting at point 71.

The first and the second example show a processing that get started as soon as point 72 gets hit. As a further modification, this processing may already start at the activation load point C, so that over the whole load range the gas turbine engine will be close to region B and therefore will be optimised regarding NOx exhausts. As yet another modification, the processing may start at any given point on the curve 60, even if curve 60 does not intersect range A.

In a third embodiment, the gas turbine will be operated with increased engine reliability by running close to region A that represents operating points with high temperatures on specific surfaces of the burner 20 or the combustion chamber. Especially if the pressure sensor or transducer signal fails and/or the gas turbine engine is running at a given site with predominant combustion dynamics problems, then running close to region A may be an option, to run the gas turbine engine most reliable. This embodiment is explained by referencing to FIG. 6B.

According to this second example, it is assumed that the fuel supply follows the main/pilot flow split map and at some point the load rises such as to start to encroach on area A (point 72). Under these circumstances the temperature information parameter will exceed the allowed maximum, the predetermined maximum temperature limit. As a result a specific active pilot control is started and the split is decremented to an assumed point 73. From this point of time, operating conditions will be monitored for a time span—e.g.

15 to 30 minutes—defined by the time information. Over this time span the operation load will be monitored and a time average is build over the load. If the time average value remains relatively constant—e.g. with a variation up to 5%—then the control processing will increase the pilot split again at a set ratio and the previous steps of monitoring the load over a time span and building a time averaging time value will be restarted.

The processing of monitoring the load and incrementing the pilot split, will be continued in iterations and the inventive fuel split control will therefore increase the pilot fuel at a set ratio until region A will be hit (point 74). If region A is hit the pilot fuel will be decreased slightly (75) to be at an operating point in the target area between region A and region B, but close to region A.

Having processed these steps, no further main/pilot fuel split alterations will be executed as long as the load remains constant.

Also From this point on, no fuel split adjustments may be executed until region A, region B, or the default fuel split map is hit.

Alternatively, further fuel split adjustments may be possible. Load changes may be monitored which can be diagnosed via the load information provided to the control arrangement 36. Once the load has increased by a predefined value—or, independently of the load, simply be waiting a pre-defined time or when region A is hit—the previously disclosed processing that start for point 72 will be executed a further time. This will be executed in several iterations so that the operating point of the gas turbine will be held close the region A. This can be seen FIG. 6B by a staircase-like curve on the left hand side in the area 62.

This mode of operation may continue with a number of subsequent iterations. This processing may end if an upper load limit or a minimum pilot fuel supply setting is reached (point 70). Then the main/pilot fuel split may stay unmodified (see curve on the right hand side of area 62) until the default fuel split may can be followed again in area 63, starting at point 71.

The given examples are especially advantageous because in one mode of operation the engine will run with the lowest achievable NOx whilst running reliable. Besides, one of the explained modes of operation will strive to reduce the NOx if the engine is run steadily over a predefined time period.

Alternatively, in the event of signal failure of a thermocouple the engine can be run temporarily close to the region B. In the event of signal failure of a combustion dynamics probe the engine can be run temporarily close to the region A. This allows stable operation until a next scheduled inspection of the gas turbine even in case of failures of monitoring equipment.

As a further advantage the invention can also be used during development testing of an engine to define the engine specific fuel schedule and lowest NOx.

One example of the placing of the temperature and pressure sensors has already been shown in FIG. 5. Several other locations can be foreseen. Possibly the temperature sensor 32 may be embedded behind the front face 39 of the burner. Hence the component being protected from overheating in this case is the front face of the burner. Alternatively the temperature sensor 32 may be embedded in the wall of the pre-chamber 22 or in a wall section of the combustion volume 23. Hence in these two cases the components being protected from overheating are, respectively, the pre-chamber wall and front wall of the combustion volume. As yet another possible location for the temperature sensor 32, it may be provided at the end of a burner lance located within a swirl chamber. The temperature sensor is preferably located at the lance tip, since it is this part of the lance which will be most prone to overheating.

In all previously mentioned examples the temperature sensor has been mounted in or on the component being monitored for overheating. Alternatively, however, it is possible to mount the temperature sensor separately from the component itself, but in a place in which it can nevertheless form an equivalent measurement of the component's temperature. For example, the temperature sensor 32 is located outside the combustor so as to be able to measure the temperature of the air in the compressor discharge area. The temperature sensor may be part of the standard instrumentation for control of the gas turbine. This arrangement allows components such as the burner and other parts of, or adjacent to, the combustor to be protected against overheating. One advantage with this arrangement is that the sensor is easily accessible and the signal already available. In this case the control is used to prevent high dynamic pressure oscillations from occluding, which in some systems has an effect on the location of the flame. This, in turn, can provide information on the metal temperature in a component. As a further alternative, the temperature sensor may be located inside the hood of the combustor and downstream of a cooling air outlet, while the pressure sensor may also be located within the hood space. The dynamic pressure oscillations appear as a flow changing direction with a certain frequency. Hence, depending on the acoustic characteristics of the system, the oscillation may be registered outside the combustion volume in a volume connected (through the burner) to the source of the oscillation, namely the heat released by the flame. The dynamic pressure sensor may be located somewhere within the casing of the gas turbine engine, even outside the combustion can, as long as the position provides pressure characteristics corresponding to the pressure characteristics within the combustion chamber.

As a further configuration, the temperature sensor may be located at the very downstream end of the combustion volume so as to form a measurement corresponding to the temperature of a first turbine vane, which in this case is the component to be protected. The temperature profile at the turbine vane is affected by the fuel distribution and hence the split between pilot and main. A direct link can therefore be seen between the metal temperature on the surface of the vane and the setting of the fuel-split valve.

In yet another possible arrangement the temperature sensor may be located such as to measure the temperature of the fuel supply feeding the fuel-split valve. The pressure sensor may be situated in the upstream part of the combustion volume. In this combustion system, pressure oscillations are triggered by a particular operating condition, more specifically a parameter such as the air temperature downstream of the compressor or the fuel temperature. When the pulsations start, this indicates that the flame has moved to a certain location in the combustor. This location in certain systems corresponds to increased heat transfer, which increases the metal temperature for the component to be protected. The algorithm therefore, through a monitoring of the fuel temperature, acts to move the flame back to a safer region.

It has so far been assumed that the fuel-split being controlled is that between main and pilot in a single burner. However, it is also possible to have more than one main supply to a combustor, in which case it may be possible to limit the use of the pilot considerably, or even do without it. In that event the present invention will control the split between the two or more main fuel supplies to the combustor, while keeping the total supply to the combustor constant, as mentioned earlier. Another possible scenario occurs when there is more than one combustor in a gas turbine. In that case it is envisaged that the split between main and pilot (or between two or more main supplies) in one combustor may involve a change in the total amount of fuel supplied to that combustor—i.e., the total amount is not kept constant—provided the total amount of fuel supplied to one or more of the other combustors is adjusted to compensate. This still means, therefore, that the total fuel supply to the whole combustion apparatus is kept constant for a particular load.

Whereas the invention has been described predominantly in connection with gas turbines, it may also be used in other combustion-related environments, such as furnaces or boilers.

It was mentioned that the two main parameters being monitored are temperature and pressure. Instead other "competing" parameters may be monitored and used as parameters X and Y in the algorithm. By "competing" is meant that the parameters have a "push-pull" effect on the operating condition, moving it nearer to area A on the one hand and nearer to area B on the other. One such parameter that may be monitored is that of emissions, e.g. NOx.

To summarise the different embodiments, a processing is provided that regulates fuel schedules (pilot split) based on a metal temperature, e.g. of the burner, and combustion dynamics readings. Parameters to be evaluated are the metal temperature, the combustion dynamics readings, an engine clock time, and an engine load or generator speed. To control the main/pilot fuel split either an inverse integral technique or a time-averaging technique is used to approach one of the borders from the regions A or B on FIG. 6, to reach a desirable point of operation. If NOx are of primary interest, then the gas turbine engine can be run reliably close to the region B. However, if the engine is run on a specific site with known combustion dynamics issues, then this technique can be applied to drive the engine to run closely to the region A.

The inverse integral is applied to one of the signals representing the metal temperature or the pressure. It will compute the time integral (under a predefined limit) and if the integral value will be fulfilled, then the pilot split will be modified (increased or decreased) to approach one of the regions A or B. The above method will always strive to maintain one of the continuously monitored signals—the burner metal temperature or pressure dynamics—within 2 limits, a maximum predefined for the pressure or the temperature and a minimum predefined value for the integral.

The time averaging will be applied to parameters such as load or engine speed (for a twin shaft configuration) to identify if the gas turbine engine is running steadily over the averaging period. If so, then the pilot split will be modified (increased or decreased) to approach one of the regions A or B.

For all embodiments and according to the invention, advantageously a mode of operation can be found, for which the number valve changes for the fuel supply can be kept to a minimum so that an update of the fuel split will not occur continuously. This allows a steady-going operation of the burners.

The invention claimed is:

1. A combustion apparatus, comprising:
   a fuel supply line to the combustion apparatus for providing an overall fuel supply to the combustion apparatus;
   at least one burner including a plurality of fuel supply lines to the at least one burner, the supply of fuel in the plurality of fuel supply lines to the at least one burner corresponding to the overall fuel supply in the fuel supply line to the apparatus;
   a combustion volume associated with the at least one burner;
   a temperature sensor located in the apparatus such as to be able to convey temperature information relating to a part of the apparatus which is to be protected against overheating;
   a pressure sensor such as to be able to convey pressure information representing pressure within the combustion volume; and
   a control arrangement arranged to vary the fuel supplies to one or more of the at least one burner based on the temperature information and on the pressure information and on a further information, the further information being a measure of a progress over time for a signal for a predefined time span defined by a time information, such as to maintain the temperature of said part to be protected below a predetermined maximum temperature limit, such as to keep the pressure variations within the combustion volume below a predetermined maximum pressure variation limit, while keeping the overall fuel supply in the fuel supply line to the apparatus substantially constant,
   wherein the control arrangement is further configured such as the signal to be processed represents a load information, the load information being indicative for a load of the combustion apparatus, and
   wherein the measure of the progress over time for the signal for the predefined time span defined by the time information is a time average of the load for the time span.

2. The combustion apparatus as claimed in claim 1, wherein the control arrangement adjusts the fuel supplies to one or more of the at least one burner if the time average of the load for the time span remains constant or deviates up to a known tolerance.

3. The combustion apparatus as claimed in claim 1, wherein, in a first mode of operation the control arrangement is further configured such as to vary the fuel supplies at points in time defined by the time information in such a way that the temperature of said part to be protected is regulated so that the difference of the predetermined maximum temperature limit and the temperature of said part represented by the temperature information does not exceed a predefined temperature threshold.

4. The combustion apparatus as claimed in claim 1, wherein, in a second mode of operation the control arrangement is further configured such as to vary the fuel supplies at points in time defined by the time information in such a way that the pressure variations are regulated so that the difference of the predetermined maximum pressure variation limit and the pressure variations represented by the pressure information does not exceed a predefined pressure variations threshold.

5. The combustion apparatus as claimed in claim 1, further comprising:
   a revolvable shaft; and
   an engine load indicator located in the apparatus such as to be able to convey load information representing engine load or torque of the shaft or revolving speed of the shaft.

6. The combustion apparatus as claimed in claim 5, wherein the control arrangement is further configured such as to keep the fuel supplies constant for a time span defined by the time information and to collect the load information during the time span.

7. The combustion apparatus as claimed in claim 6, wherein the control arrangement is further configured such as to vary the fuel supplies by a first variation value after a time lapse of the time span if a variation the collected load information during the time span stays below a predefined load threshold.

8. The combustion apparatus as claimed in claim 1, wherein the control arrangement is further configured such as if the pressure information indicates that the pressure variations under-run the predetermined maximum pressure variation limit more than a predefined pressure variation difference, the fuel supply is varied by a third variation value.

9. The combustion apparatus as claimed in claim 7, wherein the control arrangement is further configured such as if the temperature information indicates that the predetermined maximum temperature limit is reached by the temperature, the fuel supply is varied by a fourth variation value such as to neutralise, at least partly, the fuel supply variation by the first variation value.

10. The combustion apparatus as claimed in claim 9, wherein the control arrangement is further configured such as if the temperature information indicates that the predetermined maximum temperature limit is reached by the temperature a second or a further time, the fuel supply is varied by a fifth variation value.

11. The combustion apparatus as claimed in claim 1, wherein said plurality of fuel supply lines comprises a first, main fuel supply line and a second, pilot fuel supply line to each of the at least one burner.

12. The combustion apparatus as claimed in claim 1, wherein said plurality of fuel supply lines comprises first and second main fuel supply lines to each of the at least one burner.

13. The combustion apparatus as claimed in claim 11, wherein said apparatus comprises a plurality of burners and said control arrangement is arranged to vary the ratio of fuel supplies in the first and second fuel supply lines in one burner, while allowing a total fuel supply to that burner to vary, the variation of the total fuel supply to that burner being compensated by a corresponding opposite variation in the total fuel supply to another one or more burners.

* * * * *